United States Patent
Yu

(10) Patent No.: US 7,167,560 B2
(45) Date of Patent: Jan. 23, 2007

(54) PARTIAL ENCRYPTION OF STREAM-FORMATTED MEDIA

(75) Inventor: Hong Heather Yu, Princeton Junction, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 994 days.

(21) Appl. No.: 10/214,101

(22) Filed: Aug. 8, 2002

(65) Prior Publication Data

US 2004/0028227 A1    Feb. 12, 2004

(51) Int. Cl.
*H04N 7/167* (2006.01)

(52) U.S. Cl. .................. 380/200; 380/201; 380/210; 380/217

(58) Field of Classification Search ........ 380/200–203, 380/217–218, 241, 54–55, 210; 713/160–163, 713/176, 189; 705/57–59; 725/25, 30, 31, 725/87

See application file for complete search history.

(56) References Cited

U.S. PATENT DOCUMENTS

| | | | |
|---|---|---|---|
| 4,172,213 A | 10/1979 | Barnes et al. | |
| 5,303,303 A | 4/1994 | White | |
| 5,323,464 A | 6/1994 | Elander et al. | |
| 5,805,700 A | 9/1998 | Nardone et al. | |
| 6,070,245 A | 5/2000 | Murphy, Jr. et al. | |
| 6,415,031 B1 | 7/2002 | Colligan et al. | |
| 6,965,996 B1 * | 11/2005 | Hirano et al. ............... | 713/176 |

OTHER PUBLICATIONS

Weiping Li; "Overview of Fine Granularity Scalability in MPEG-4 Standard"; 2000 IEEE; pp. 301-316.

* cited by examiner

*Primary Examiner*—Hosuk Song
(74) *Attorney, Agent, or Firm*—Harness, Dickey & Pierce, PLC

(57) ABSTRACT

A method of partially encrypting streaming media according to an embodiment of the invention comprises: receiving media in a streaming-media format; partitioning the stream-formatted media into cloak data and non-cloak data; and encrypting the cloak data such that less than all of the stream-formatted media is encrypted.

25 Claims, 9 Drawing Sheets

```
14 3 6 2 2 0 0 0
1 2 4 0 0 0 0 0
3 1 5 1 1 0 0 0
4 1 2 1 0 0 0 0
1 0 0 0 0 0 0 0
0 0 0 0 0 0 0 0
0 0 0 0 0 0 0 0
0 0 0 0 0 0 0 0
```
Fig. 6A
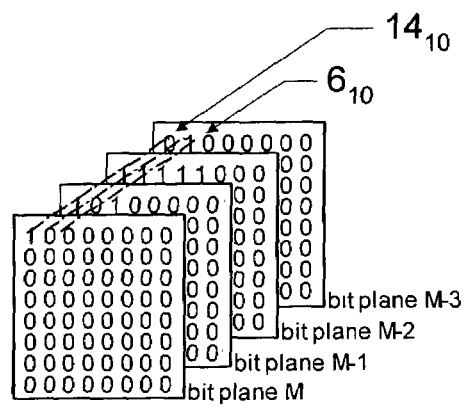
Fig. 6B
```
1 0 0 0 0 0 0 0    1 0 1 0 0 0 0 0    1 1 1 1 1 0 0 0    0 1 0 0 0 0 0 0
0 0 0 0 0 0 0 0    0 0 1 0 0 0 0 0    0 1 0 0 0 0 0 0    1 0 0 0 0 0 0 0
0 0 0 0 0 0 0 0    0 0 1 0 0 0 0 0    1 0 0 0 0 0 0 0    1 1 1 1 1 0 0 0
0 0 0 0 0 0 0 0    1 0 0 0 0 0 0 0    0 0 1 0 0 0 0 0    0 1 0 1 0 0 0 0
0 0 0 0 0 0 0 0    0 0 0 0 0 0 0 0    0 0 0 0 0 0 0 0    1 0 0 0 0 0 0 0
0 0 0 0 0 0 0 0    0 0 0 0 0 0 0 0    0 0 0 0 0 0 0 0    0 0 0 0 0 0 0 0
0 0 0 0 0 0 0 0    0 0 0 0 0 0 0 0    0 0 0 0 0 0 0 0    0 0 0 0 0 0 0 0
0 0 0 0 0 0 0 0    0 0 0 0 0 0 0 0    0 0 0 0 0 0 0 0    0 0 0 0 0 0 0 0
```
Fig. 6C
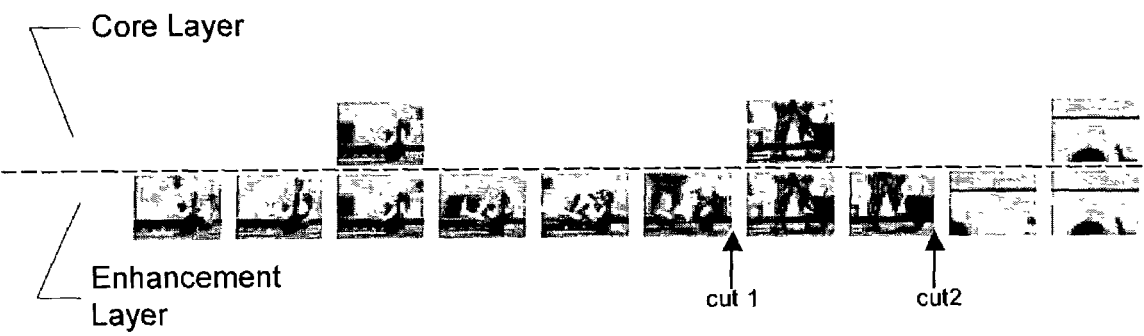
Fig. 7 bit plane M
bit plane M-1
bit plane M-2
bit plane M-3

PARTIAL ENCRYPTION OF STREAM-FORMATTED MEDIA

BACKGROUND OF THE INVENTION

Use of the internet continues to grow. Much of that use involves the accessing of files. The bandwidth available to the average user has reached a capacity at which people routinely access remote media, e.g., video and/or audio, via the Internet.

The original technology used on the internet for accessing remote files was developed for files whose content represented text or static images, i.e., non-video. Before a recipient could view the text and/or image file, it was necessary for the entire file to be downloaded. When media was first downloaded it was likewise necessary to download an entire media file before any part of it could be viewed and/or listened to by the recipient.

It was, and remains, a problem that media in digital format is relatively easy to copy and/or distribute, depending upon the available bandwidth. To control access to the media being downloaded, providers of the media began to encrypt the media. Just as for viewing and/or listening to a down-loaded file (that was not encrypted), decryption typically began once the entire file had been downloaded.

Then it was realized that some media is generally serial in the manner in which it is perceived by the recipient. In other words, the recipient does not perceive the whole of the media at the same time. Rather, for the example of a movie, the recipient typically begins watching the movie at the start and watches it continuously until the end. Also, certain large text files are read from the beginning to the end. Thus, the Background Art realized that such files can be downloaded in a manner in which reconstruction and viewing-of/listening-to the files can begin before all of the data representing the file is received, which corresponds generally to sending such a file in order from its beginning to its end. This has been referred to as streaming the data to the recipient. The file being downloaded begins to be played/displayed moments after it is received and continues to play so long as additional data is received.

Conventional cryptographic algorithms are designed for text files (called messages in cryptography). To ensure high security, the entire text file (message) is encrypted before delivery. Compared to text data, media data, especially video and audio data, typically represents much larger files. Due to the high data rate needed for real-time delivery of those types of media files, encryption may add abundant processing overhead, making media streaming or real time accessing difficult to achieve. That is, the encryption techniques according to the Background Art are incompatible with real time or streaming data.

In addition, if a medium is compressed, encrypting the entire media file using conventional cryptographic algorithms may cause serious error propagation problems. If one bit is lost during transmission, the entire file may have to be retransmitted which will increase the bandwidth demand a great deal.

A solution to the general problem of encryption overhead is posed by U.S. Pat. No. 5,303,303, which discloses encrypting the body message only and leaving the header and trailer information unencrypted for data transmission over a packet switching network. The header information can then be used for proper data delivery. In the case of video and audio, the video and audio content data are still fully encrypted since only the header and trailer data are separated out. While addressing the problem of bit loss, this does not provide a sufficient solution to the real time, e.g., it is not compatible with streaming data transmission.

U.S. Pat. No. 4,172,213 teaches how to encrypt a message on a byte-by-byte basis to support selective encryption. However, the '213 patent presumes operation upon a conventional message in which all parts of the message are treated as being equally important which may result in over-encryption or under-encryption, in other words, over-protection or under protection.

In U.S. Pat. No. 6,070,245, a system and method for controlling encryption to be on or off during a connection oriented session between client and a server over the Internet is taught. A keyword or command carrying a unique structured field is provided to indicate when an encrypted mode should be made active or inactive. Because the command/keyword insertion has to be a pre-processing step, it is not adequate for the real time and streaming media applications.

When a data stream is broadcasting through multiple types of networks to different types of devices, it is often necessary to adapt the amount of data transmitted and amount of encryption, i.e., the amount of bandwidth and additional processing corresponding to the encryption, to each different type of network and device. A fixed field with a fixed indicator for toggling encryption on and off, such as disclosed in the '245 patent, will not provide the capability needed.

U.S. Pat. No. 6,415,031 teaches selective encryption for video on demand. A selective encryption field is used to indicate the data to be encrypted, for instance if an I-frame is to be encrypted or if an I-frame and a P-frame are to be encrypted. Since a field is used to indicate the payload to be encrypted, it has to be format compliant. The I- P- B-frame based selective encryption of the '031 patent will be useful for video in MPEG format but not for audio or video in Jmovie or another format. Further, the technique of the '031 patent does not provide sufficient scalability to accommodate data transmission over different types of networks to different types of devices. By using conventional encryption algorithms, significant computational power is needed and a significant bit rate increase may be observed due to a change in the statistical property of the data if the encryption is done on the frequency domain. Moreover, at most three levels of security can be achieved or the number of I-frames has to be increased, which will increase the bit rate significantly.

U.S. Pat. No. 5,805,700 teaches selectively encrypting compressed video data based on policy. Specifically it teaches how to selectively encrypt the start code of a GOP (group of pictures) or an I- P- B-frame in a MPEG-formatted video to achieve video image degradation with substantially less processing needed in contrast to that of full encryption. Because it is policy based, a policy has to be set via either human interaction or preprocessing of the video data via a statistical analyzer. Further, scalability is not achieved.

Network channel capacity at any given time, depending on the traffic and the type of connection, varies over a wide range. According to Li, "Overview of Fine Granularity Scalability in MPEG-4 Video Standard", in IEEE Transactions on Circuits and Systems for Video Technology, Vol. 11, No 3, March 2001, an objective of video coding and transmission for Internet streaming video is to optimize the video quality over a given bit rate range. The bitstream should be partially decodable at any bit rate within the bit rate range to reconstruct a video signal, i.e., fine granularity scalability should be provided. As a result, media, video, image, audio, graphics, or voice encryption should be able to provide compatible fine granularity scalability, otherwise an encrypted media stream will not be able to be transmitted or reconstructed efficiently or correctly.

SUMMARY OF THE INVENTION

Embodiments of the invention are directed to selective encryption capability for audio and video of various types and for various applications, the embodiments providing one or more of: discriminative partition such that more important information (e.g., data layers) are encrypted first and more securely while less important data layers are encrypted second and less securely, etc., thereby achieving scalability; multi-dimensional and multi-layered encryption capability to accommodate different application needs and/or to make different quality levels of preview available to different types of users (e.g., lower level with least clear data preview for general population, higher level preview with clearer data for club members, and full playback for authorized or paid customers); fine granularity scalable encryption for a fine granularity scalable coded media data stream especially useful in real time and streaming media applications.

Other embodiments of the invention provide a method of partial encryption suitable for non-format-compliant media such that no specific field is needed in the data structure (media stream) to indicate which part of the data is encrypted.

Yet other embodiments of the invention provide methods to select different encryption algorithms from a set of encryption algorithms in order to differently encrypt subsets of the portion of the media being encrypted, i.e., to achieve differentiated partial encryption.

Another embodiment of the invention provides a method of partially encrypting streaming media, the method comprising: receiving media in a streaming-media format; partitioning the media into cloak data and non-cloak data; and encrypting the cloak data such that less than all of said stream-formatted media is encrypted.

Additional features and advantages of the invention will be more fully apparent from the following detailed description of example embodiments, the appended claims and the accompanying drawings.

BRIEF DESCRIPTION OF THE DRAWINGS

FIGS. 6A, 6B and 6C depict bit plane encodation.

FIG. 7 depicts layered encodation reflecting a partition in the spatial dimension according to the embodiment of the invention.

The accompanying drawings are intended to depict example embodiments of the invention and should not be interpreted to limit the scope thereof; and not to be considered as drawn to scale unless explicitly noted.

DETAILED DESCRIPTION OF EXAMPLE EMBODIMENTS

In the following description, various aspects of the present invention will be described. It is apparent to those skilled in the art that some or all aspects may be used with or without variations. Specific configurations are set forth for explanation purposes only. Nevertheless, the specific configuration may or may not be used (as would be apparent to those skilled in the art) to implement a fully functional system for different applications. Also, well known techniques are omitted/simplified. Part of the description will be presented in terms of operations performed by a general purpose computer system or a specific purpose embedded data processing machine (e.g., an ASIC), electronic system, computational system and the like that can be realized in both software and hardware by those skilled in art.

The invention, in part, represents a recognition that the very same qualities of certain types of data, e.g., data representing media, that make the data suitable to be streamed to a recipient also make the data especially suited to a type of encryption that represents a significantly reduced computational load. In other words, because the perception of media is serial or sequential, if portions of the stream are encrypted, then the serial/sequential perception is disrupted. Where the encryption-caused disruption is slight, the recipient will only be aware of a slight degradation in the quality of the media. But where the encryption is more significant, there comes a degree of disruption at which the media is rendered substantially imperceptible or of such low quality as to be substantially unsuitable to the recipient. Further, the degree of disruption at which the media becomes substantially imperceptible or substantially unsuitable to the recipient corresponds to partial encryption. As such, the invention, also in part, is a recognition that a media can be rendered substantially imperceptible or substantially unsuitable to a recipient by encrypting less than all of the media, i.e., by merely partially encrypting the media.

Figure 1:
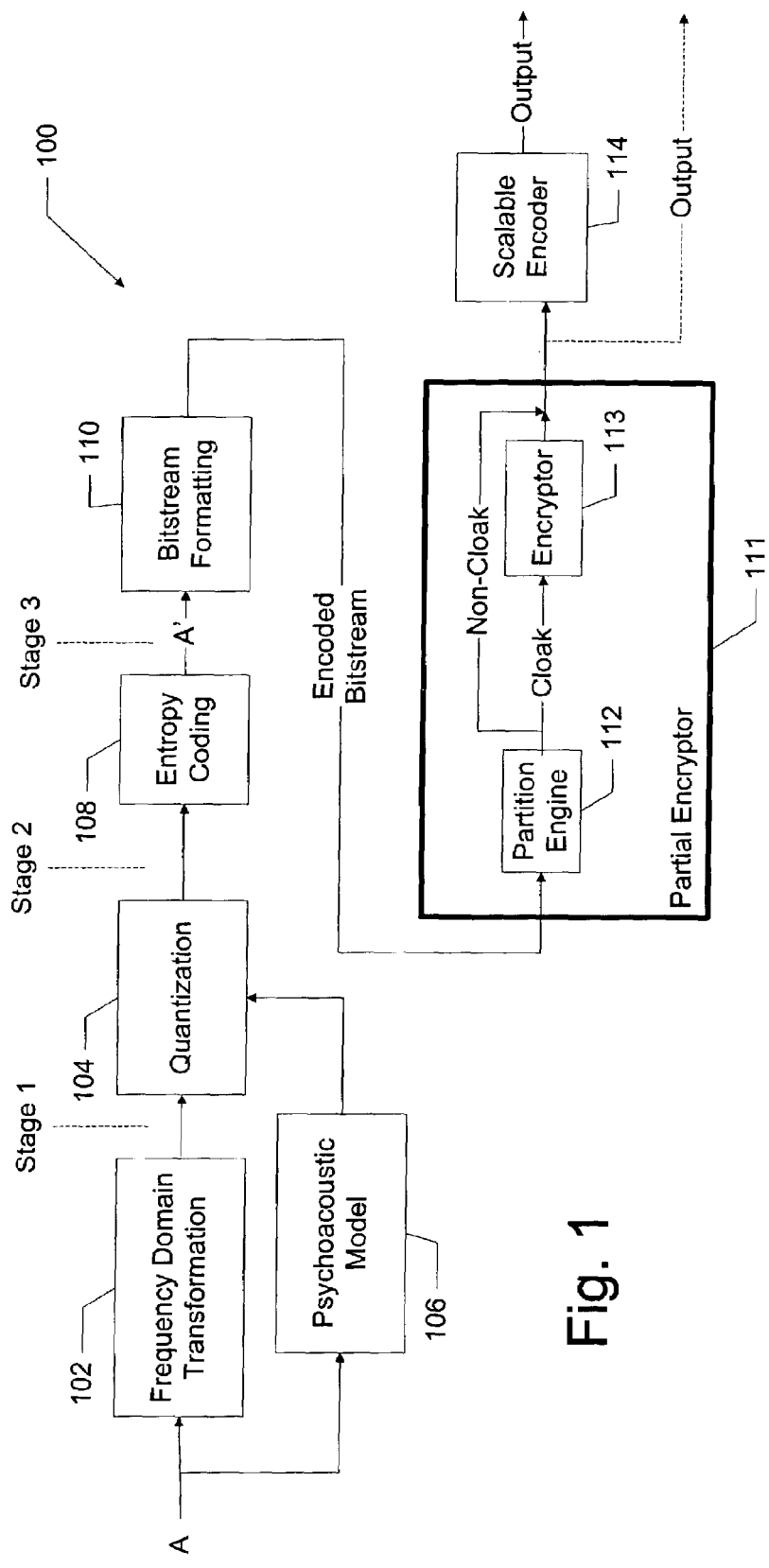
FIG. 1 is a schematic block diagram of a streaming media engine according to an embodiment of the invention.
Figure 10:
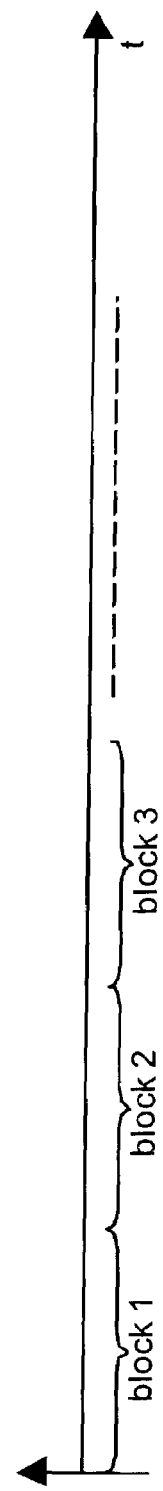
FIG. 10 is a graph depicting the encoded bitstream according to an embodiment of the invention organized into a sequence of blocks.

FIG. 1 is a schematic block diagram of a bit-stream-formatting engine 100 according to an embodiment of the invention. The engine 100 includes a frequency domain transformation unit 102, a quantization unit 104, a psychoacoustic model 106, and entropy coding unit 108 and a bitstream formatting unit 110. The units 102, 104, 106, 108 and 110 are known, e.g., see "Information Technology— Coding Of Moving Pictures And Associated Audio For Digital Storage Media At Up To About 1.5 Mbit/s," ISO/IEC 1172-1, the entirety of which is hereby incorporated by reference. The frequency domain transformation unit 102 can be, e.g., a discrete cosign transformation (DCT) unit or a modified DCT (MDCT) unit.

The encoded bitstream provided at the output of the bitstream formatting unit 110 can be, e.g., MP3 audio, i.e., audio layer 3 of the MPEG standard. The MP3 format is widely used in audio applications, especially music distributions/downloads. The signal A received by the frequency domain transformation unit 102 and the psychoacoustic model 106 can be pulsed-code-modulated (PCM) audio. The frequency domain transformation 102 transforms the signal A into the frequency domain and provides the frequency domain coefficients to the quantization unit 104. The signal A is also provided to the psychoacoustic model 106. Based upon the signal A, the psychoacoustic model 106 adaptively controls the quantization ranges used by the quantization unit 104 so as to minimize distortion perceptible by a human listener. Quantized frequency domain coefficients are provided to the entropy coding unit 108 by the quantization unit 104. The entropy coding unit 108 encodes the quantized coefficients based upon entropy considerations and provides coded coefficients to the bitstream formatting unit 110. The bitstream formatting unit 110 takes the coded coefficients and formats them into streaming data, e.g., such as the blocks depicted in FIG. 1B.

The engine 100 further includes a partial encryptor unit 111 and a scalable encoder unit 114.

The partial encryptor unit 111, which includes a data stream partition engine 112 and an encryptor 113, receives either the compressed bitstream from the bitstream formatting unit 110 (or an uncompressed bitstream in the base domain), partitions the data stream into at least two segments (cloak data and non-cloak data), and encrypts at least one segment (cloak data) of the bitstream (to be discussed in more detail below), with the effect being that of partial encryption. The encryptor 113 can select from a variety of known algorithms, e.g., DES (Data Encryption Standards), scrambling, sign flipping, key-based exclusive XOR, byte-by-byte encryption (U.S. Pat. No. 4,172,213), TTM (Tame Transformation Method), or any other encryption algorithm that is suitable for a specific application. The partially encrypted bitstream can be output to the recipient (as depicted by the dashed line), e.g., via the Internet. Alternatively, the partially encrypted bitstream can be provided to the scalable encoder 114, which scalably encodes the partially encrypted bit stream before outputting it to the recipient.

The encoder 114 either encodes the partially encrypted bitstream into layers, e.g., a core layer and at one enhancement layer (to be discussed in more detail below), or encodes the partially encrypted bitstream based upon a partition in the bit plane dimension for fine granularity scalability (to be discussed in more detail below). Partial encryption may be done on the frequency domain or the compressed data stream domain. For scalable and fine granularity scalable encryption, it is preferred to perform partial encryption during compression on the frequency domain. In this case, a partial decoding process is needed for fully compressed data stream.

Figure 2:
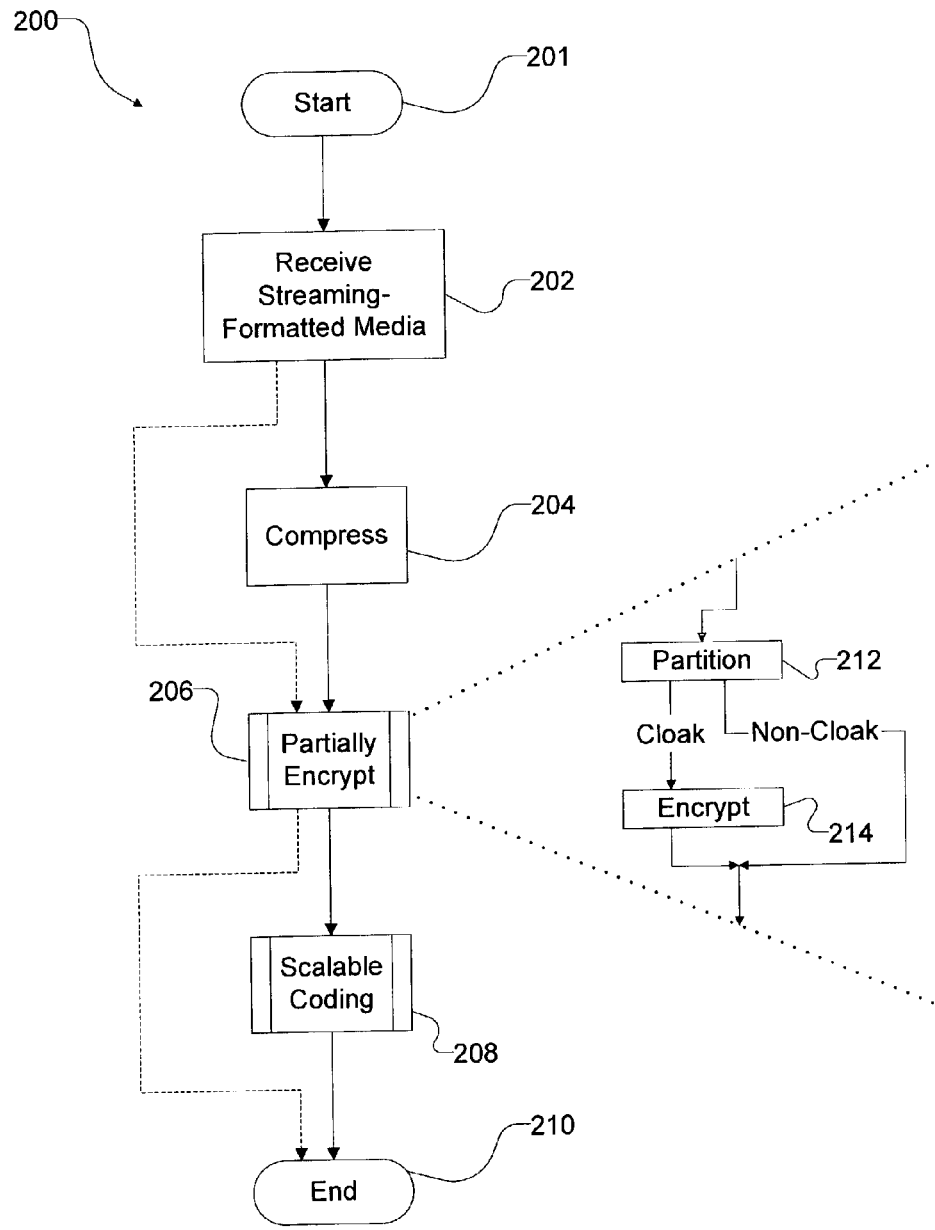
FIG. 2 depicts a flowchart of operations according to an embodiment of the invention.

FIG. 2 depicts a flowchart 200 of operations according to an embodiment of the invention. Flow begins at block 201 and proceeds to block 202, where the streaming-formatted media is received, e.g., from the bitstream formatting unit 110. Flow can proceed from block 202 to block 204, where the streaming-formatted media is compressed according to one of a variety of well known compression techniques, e.g., JPEG (Joint Photographic Experts Group) and MPEG (Moving Picture Experts Group) compression standards.

Flow can proceed from block 204 to block 206, where the stream-formatted media is partially encrypted. The partial encryption block 206 can include a block 212 where the stream-formatted media is partitioned into cloak data and non-cloak data. From block 212, the cloak data is encrypted at block 214. The non-cloak data is not encrypted. Further discussion of the partial encryption can be found below.

Flow can proceed from block 206 to block 208 in which the partially-encrypted media, i.e., the recombined cloak data and the non-cloak data, is scalably encoded (to be discussed in more detail below). Flow proceeds from block 208 to block 210, where flow ends. The data provided when block 210 is reached corresponds to the output of the engine 100. Alternatively, flow can skip block 208 and proceed directly from block 206 to the end block 210.

Figure 3:
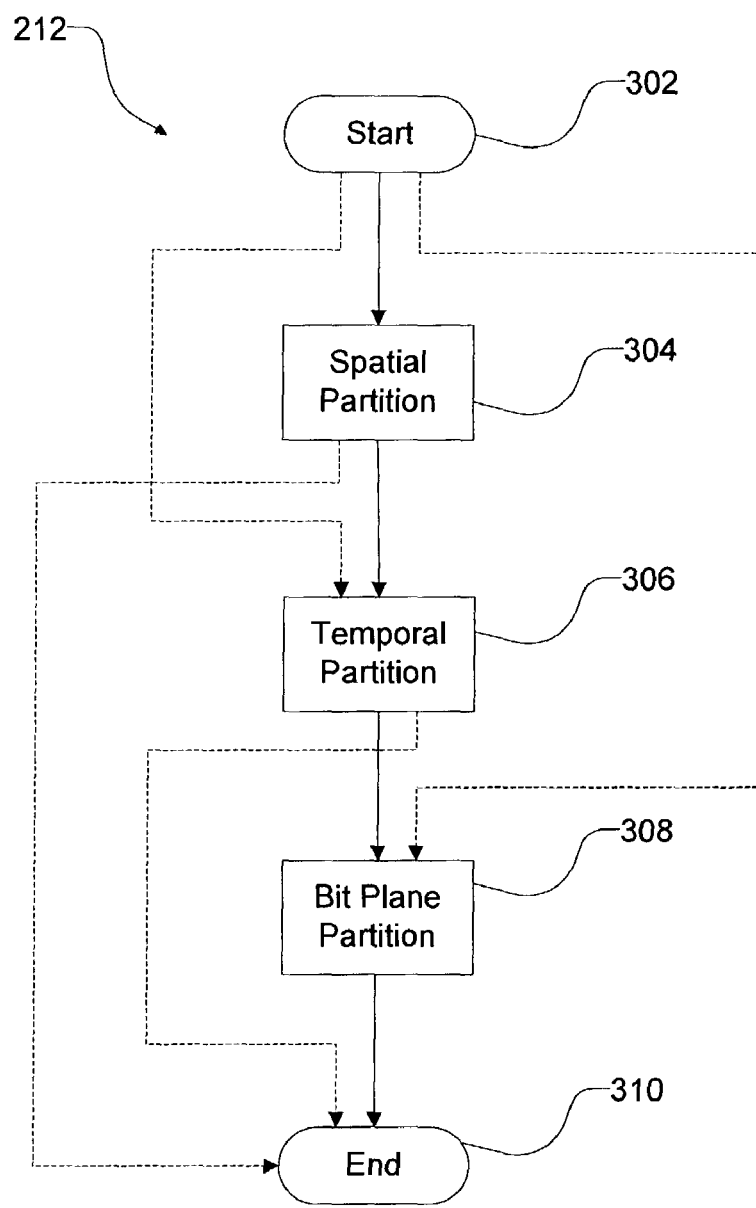
FIG. 3 depicts operations of an aspect of FIG. 2 in more detail according to an embodiment of the invention.

FIG. 3 depicts the data partition block 212 of FIG. 2 in more detail according to an embodiment of the invention. The data partition takes place in one or multiple dimensions. Flow starts at block 302 and can proceed directly to block 304, where the media is partitioned along the spatial dimension. In general, spatial dimension partitioning is known. For example, an image can be split into three sections, with a center section representing approximately ½ of the image and each of the outer sections representing approximately ¼ of the image. The center section can be encrypted while the outer sections can be left unencrypted. Typically, the more important content information in an image is found in the center of the image due to the human preference for centering subjects within an image.

From block 304, flow can proceed to block 306, where the spatially-partitioned media can be partitioned along the temporal dimension. Temporal partitioning is well known. For example, in a circumstance in which a stream of blocks is provided, a temporal partition can take the form of dividing the blocks into odd blocks and even blocks. Either the odd blocks or the even blocks can then be encrypted.

Alternatively, flow can skip the block 304 and proceed directly from block 302 to block 306. Further in the alternative, flow can proceed directly from the block 304 to the end block 310.

From block 306, flow can proceed directly to block 308, where the media is partitioned along the bit plane dimension. Alternatively, flow can skip the block 308 and proceed directly from block 306 to the end block 310. Also in the alternative, flow can proceed directly from the start block 302 to the block 308.

Figure 4:
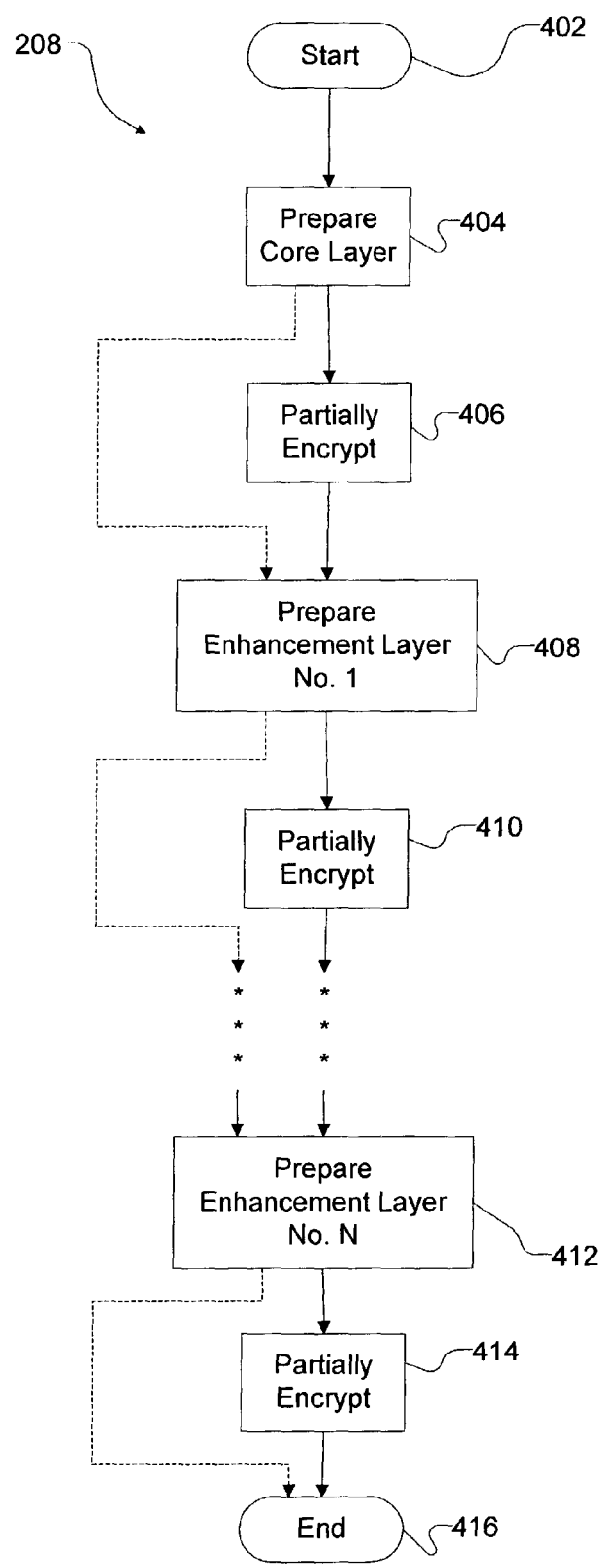
FIG. 4 depicts operations of another aspect of FIG. 2 in more detail according to an embodiment of the invention.

FIG. 4 is a flow chart that depicts operations of the block 208 in more detail according to an embodiment of the invention. Flow begins at block 402 and proceeds to block 404, where the partially-encrypted media is processed to prepare a core layer 404. Flow can proceed directly from block 404 to block 406, where the core layer can itself be partially encoded. Flow proceeds from block 406 to block 408. Alternatively, flow can skip block 406 and proceed directly from block 404 to block 408.

In block 408, the partially-encrypted media obtained at block 206 is further processed to prepare enhancement layer No. 1. Flow can proceed directly to block 410, where enhancement layer No. 1 is itself partially encrypted. Flow can proceed from block 410 to block 412. Alternatively, flow can skip block 410 and proceed directly to block 412 from block 408.

In block 412, the partially-encrypted media obtained as the output of block 206 is again processed to prepare the $N^{th}$ enhancement layer. For layer scalable encodation, there must be at least two layers, namely a core layer and one enhancement layer. However, there can be up to N enhancement layers, where N is a positive integer greater than 0. As before, the flow can proceed from block 412 directly to a partial encryption block 414, and then from block 414 to the end block 416. Alternatively, flow can skip block 414 and proceed directly from block 412 to the end block 416.

In such scalable encryption corresponding to scalable coding, a base layer and/or one to several of all the enhancement layers are selected and encrypted separately using the same encryption or different algorithms based on the application specification. Different keys are provided such that those having the base layer decryption key may view the media in lower quality while those having both the base and one or more enhancement layer keys may view the media in higher quality. When the application is not for access control but to stream the media through various networks to various devices with different processing capability, one key instead of multiple keys can be used in all layers.

As increasingly higher quality streaming data is provided, greater computation loads will be placed upon decoding engines. Encryption can be viewed as computation overhead because its purpose is merely to conceal or to cloak the data, thereby controlling access to the data. As such, the need to reduce the computational load represented by a decryption engine will become increasingly important.

Partially encrypting streaming media reduces the encryption overhead, which can significantly improve real time performance. Keeping the decryptor low in complexity can also reduce the system cost when the decryptor is embodied in hardware.

When the media is layered, various embodiments of partial encryption according to the invention will be discussed. A distributor or broadcaster can provide a low quality version of the image, e.g., free of charge, by not encrypting the core layer. Recipients wishing to view/listen-to a higher quality version of the media can be furnished with a key (for a fee) that will decrypt the one or more enhancement layers. Further, different levels of preview capability can be implemented by providing different layers of encryption keys.

For example, consider a situation in which viewers/listeners fall into three categories: non-club-members; club members; and authorized customers. Two such scenarios will be discussed. For non-club members, only the unencrypted core layer in very low quality can be viewed or listened. For a club member, an enhancement layer representing better (but not the best) quality can be previewed using his club membership number as a key or using a private key provided by the content distributor that can be encrypted with his membership number and pass code. The authorized customer who paid for the medium can access another enhancement layer representing the highest quality with a single (or multiple) decryption key(s) obtained at time of purchase.

Alternatively, a multidimensional partition followed by a multilayer encryption can provide only the first e.g., 20 seconds of the core layer data in the clear (unencrypted) and encrypt the remainder of the core layer data using a first key, with the enhancement layer data being encrypted with a second key. For non-club members, e.g., 20 seconds of the medium at a low reproduction quality only can be previewed while the club member can be provided with the first decryption key to preview the medium in full albeit in low quality. A recipient with both the first and the second decryption keys (for a fee) can decrypt the entire medium and enjoy it in its full and highest quality.

Alternatively, where it is desired to encrypt to the same degree for all viewers/listeners, the core layer but not the enhancement layers can be encrypted.

Figure 5:
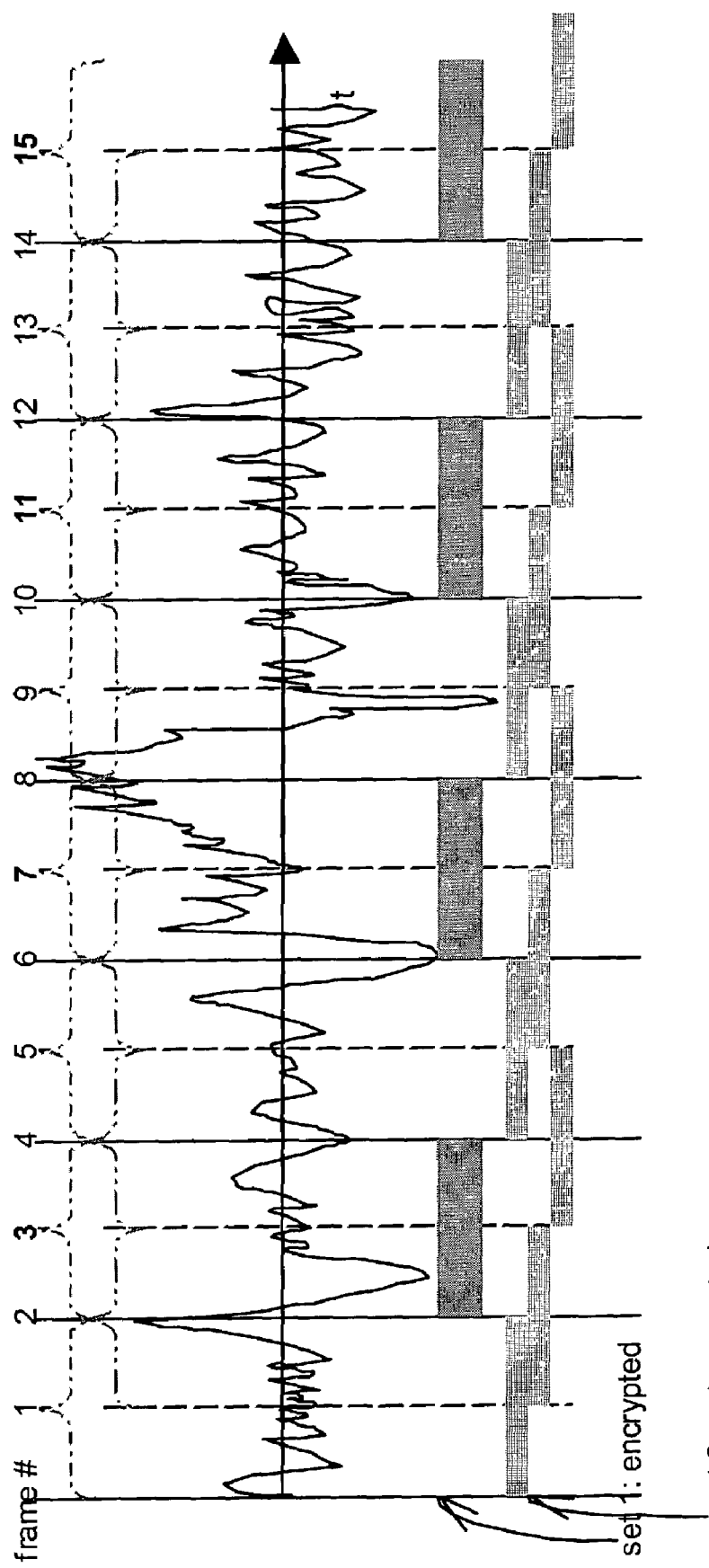
FIG. 5 is a graph depicting partial encryption along a temporal dimension partition according to an embodiment of the invention.

FIG. 5 is a graph depicting partial encryption based upon a temporal dimension partition, such as in block 306. An audio waveform is plotted in FIG. 5. Frames along the time axis, t, are also plotted. In the example of FIG. 5, the third, seventh, eleventh, fifteenth, etc. frames are encrypted while the other frames are not encrypted. Since less than all the frames are encrypted, this represents partial encryption.

Stated differently, the example of FIG. 5 can be described as defining an audio data stream as $X=\{X_1, X_2, X_3 \ldots X_T\}$ with a total number of T frames. Let S1 and S2 be two sets such that for any $t=1, \ldots T$, $X_t \epsilon S1$ or $X_t \epsilon S2$. The above partition equals $$X_t \in S1, \text{ if } t = 4k - 1$$
$$X_t \in S2, \text{ if } t = 4k - 3 - 2, \text{ or } 4k$$
$$\text{for } k = [1, T]$$

In the example of FIG. 5, only 25% of the data bits are encrypted. As contrasted with the encryption of every data bit, the computation complexity of the technique corresponding to example FIG. 2 represents a 75% reduction in computational complexity.

An alternative embodiment is to choose the data to be encrypted based upon the content of the data. The data partition engine partitions the data in one or multiple dimensions according to the importance of the data in terms of conveying information. Content-significant data can be encrypted while content-insignificant data is not encrypted. Without being able to decrypt the content-significant data, the streaming data as whole is rendered substantially imperceptible or substantially unsuitable for its purpose, e.g., by being substantially devoid of that which makes it desirable.

In the circumstance in which the stream-formatted media is formed based upon either a discreet cosign transformation (DCT) or a modified DCT (MDCT), the content-significant data tends to correspond to the DC coefficients and the lower frequency AC coefficients. The DC coefficients together with the low frequency AC coefficients can give a low quality version of the media. As such, an embodiment of partial encryption according to the invention can be to encrypt the lower frequency coefficients of the DCT or MDCT while not encrypting the higher frequency coefficients. Alternatively, a core layer may be generated from the DC and low frequency AC coefficients and several layers of enhancement layers corresponding to higher frequency AC coefficients may be generated to achieve scalable partial encryption.

Similar partitions can be done on other dimensions or domains of a media data stream to realize scalable partial encryption. For instance, the most significant bit is considered more important than other bits while the least significant bit is considered least important based on the amount of visual information of the original content each bit can convey. Within each image or each frame of a video, often there can be some regions that contain more import information than others. Statistically, the important information is often distributed around the center of an image or in the foreground. Along the time axis, there are groups of segments that can be more important than others. Consequently, a partition may be done along a bit dimension or a frequency dimension of any type of media, a block dimension within each frame of video or an image, a temporal dimension in a video or an image, or by multiple dimensions in spatial, frequency, temporal, or bit plane domain simultaneously.

Computational complexity and level of security are competing design considerations, in general. For situations in which the level of security required is relatively slight, many types of partition can be used. For example, one might choose simply to encrypt only the header of each frame. As another example, one can choose to scramble only the sign of each frequency domain coefficient. The corresponding decryption requires only a bit-by-bit XOR operation, which introduces a minimal computational overhead.

Lightly weighted encryption such as scrambling is generally preferred in many commercial media such as movies and music due to their significant decrease in value over time. In the case of scrambling, it is preferred not to destroy the statistical structure of the data when encrypting a compressed or to-be-compressed data stream. For instance, the non-zero coefficients can be scrambled while the zero coefficients are left intact when encryption is done in the frequency domain.

The coefficients can be scrambled with closer relationships. For instance, the DC coefficients of a series of blocks/segments and the low band AC frequencies of a series of blocks/segments can be scrambled separately to preserve the data statistical distribution. In this way, the original statistical structure of the data stream can be kept relatively intact. The zeros can still be clustered together instead of scrambled into a random fashion. Therefore, no significant bit rate increase is experienced. To achieve a good security level, scrambling can be done across block boundaries and frame boundaries.

Secret key encryption algorithms are generally much faster than public key encryption algorithms. Thus, secret key encryption algorithms are better suited to delivering real time performance, in general. In a circumstance in which a higher level of security is desired, the Data Encryption Standard (DES) encryption algorithm can be used, which provides a good balance of high security and relatively fast execution time compared to public key encryption algorithms. Alternatively, a simple scrambling algorithm with a secret key randomly changing certain content critical parameters could be used. Where a public key algorithm is desired for streaming media, the tame transformation method (TTM) encryption algorithm can be used.

In fine granularity scalable encryption (referred to as FGSE hereafter) corresponding to fine granularity scalable coding (referred to as FGSC hereafter), a media sequence is also partitioned into a base layer and an enhancement layer based on FGSC and encryption algorithms may be separately selected and used on each layer. Because FGSC uses bit-plane coding that fully utilizes bit-plane statistical structure to achieve low bit rates and fine granularity, it is preferable to preserve the bit-plane statistics during encryption. Conventional algorithms, such as DES, cannot achieve this goal. If a full bit plane scrambling is used, the statistics will also be altered in many cases and hence increase the bit rate dramatically. If, however, a bit plane A in a given block is switched with another bit plane B in the same block or in another block, the statistics may be preserved while the data is degraded to a virtually useless state, especially when the bit planes corresponding to the most significant bits are scrambled.

More particularly, if bit plane A in a given block is switched with the same bit plane in another block, fine granularity scalability can be easily preserved. Alternatively, in a situation involving block-DCT-based compression, rotating a block 180° about an axis between the DC coefficient and the highest AC coefficient (block rotation), switching a selected row with a selected column (partial rotation), switching a selected row with a selected row or column in a neighborhood block, sign bit scrambling, or a combination of any of the above can be done first followed by bit plane partitioning thereafter. With FGSE, the enhancement layer can be truncated into many strata to provide partial decryption proportional to the number of bits decrypted such that when the data stream is broadcasting through multiple types of networks to different types of devices, the adaptation of the amount of data transmitted and amount of encryption to the different type of network and device can be optimized.

In order to avoid using a specific field in a specific data format, a key K can be used to tell which encryption algorithm may be used on which data partition/layer and how scrambling of bitplane is done. Decryption is done via the knowledge of the key, just as with conventional cryptographic algorithms. Details of scalable coding and FGSC can be found in "Overview of Fine Granularity Scalability in MPEG-4 Video Standard", in IEEE Transactions on Circuits and Systems for Video Technology, Vol. 11, No 3, March 2001, the entirety of which is hereby incorporated by reference.

FIGS. 6A, 6B and 6C collectively represent a partition using the bit plane dimension. FIG. 6A depicts an array of decimal numbers. Each of the numbers in the array of FIG. 6A can be represented by a 4-bit binary number. FIG. 6B depicts four bit planes corresponding to the bit positions of the 4-bit binary representation of the numbers in the array of FIG. 6A. As is known, keeping the respective bit positions in separate arrays or bit planes confers numerous advantages, e.g., loss of packets corresponding to one of the bit planes degrades but does not destroy the representation of the data found in the array of FIG. 6A. FIG. 6C depicts the bit planes of FIG. 6B side-by-side.

Figures 8A, 8B, 8C, 9:
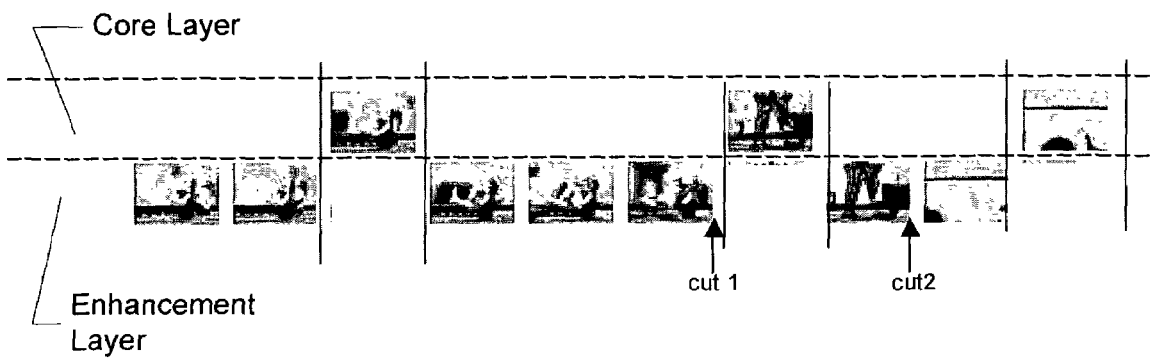
FIGS. 8A, 8B and 8C depict partial encryption of bit plane encodation according to an embodiment of the invention.
FIG. 9 depicts partial encryption of layered encodation according to an embodiment of the invention.

FIGS. 8A, 8B and 8C collectively represent an example of partial encryption according to an embodiment of the invention. FIGS. 8A–C correspond to FIGS. 6A–C, with the following exceptions. In FIG. 8B, the $M^{th}$ bit plane is separated from the other bit planes. The $M^{th}$ bit plane can be encrypted while the other bit planes are not encrypted. Again, encryption of less than all of the bits represents partial encryption. FIG. 8C shows the bit planes arranged side-by-side albeit with the encrypted $M^{th}$ separated from the others because it is encrypted.

FIG. 7 is a graph of video frames versus time, arranged according to a layered scalability scheme. In FIG. 7, the core layer has fewer images than the enhancement layer. Hence, the core layer represents a temporal partition as contrasted with the enhancement layer. In addition, the core layer of FIG. 7 contains images at a lower resolution than the images in the enhancement layer. A distributor/broadcaster who provides the layered data of FIG. 7 can satisfy recipients representing a variety of download capabilities. A recipient with a low bandwidth capability can receive the core layer. But a recipient with a much higher bandwidth can be satisfied by also decoding the enhancement layer.

FIG. 9 depicts a graph of video frames versus time that represents an example of partial encryption according to an embodiment of the invention. Differences with respect to FIG. 7 will be discussed. In FIG. 9, the enhancement layer can be encrypted but the core layer is not. Encryption of less than all of the data represents partial encryption, as before. A distributor/broadcaster can consider the core layer as in advertisement that might entice a recipient to purchase a key to decrypt the enhancement layer and thereby receive a full or high quality version of the media. It is noted that the arrows cut 1 and cut 2 in FIG. 9 denote scene changes. The data in the core layer is not enough to convey the whole content of the media to a recipient. Rather, it is sufficient to pique the curiosity and interest of a recipient as to what the full or high quality image might contain.

According to another embodiment of the present invention, a key K can be used to indicate value of the variables such as the encryption/scrambling algorithms used, the partition dimensions and domains, and the level of encryptions. An authorized receiver R can receive the key K most probably in an encrypted form that can be decrypted with R's private key Kp. If different levels of security and scalability are specified, R can have one or more of the layer decryption keys that may be packaged together with or separate from K. With the decryption keys, the decoder can successfully decrypt the media content to the specific detail levels for a specific playback quality level.

It is to be understood for certain kinds of video or audio, for instance military video/audio, it may be required to encrypt the entire video with a strong encryption algorithm to achieve the highest security. When computational time is a significant consideration, scalable and fine granularity scalable (when streaming or real time is required) encryption may be used such that the strongest encryption (that requires the most processing time) can be used on the most sensitive information part while less strong encryption (with less computational complexity) can be used in a less sensitive information part etc. In general, selective switching of encryption strength is known. For example, see U.S. Pat. No. 5,323,464, which is hereby incorporated by reference, and which discloses a method for selecting between two different types of encryption, specifically a weak symmetric cryptographic algorithm CDM (commercial data masking) and a strong encryption algorithm DEA (Data Encryption Algorithm) of encryption algorithms for use on different data.

Figure 11:
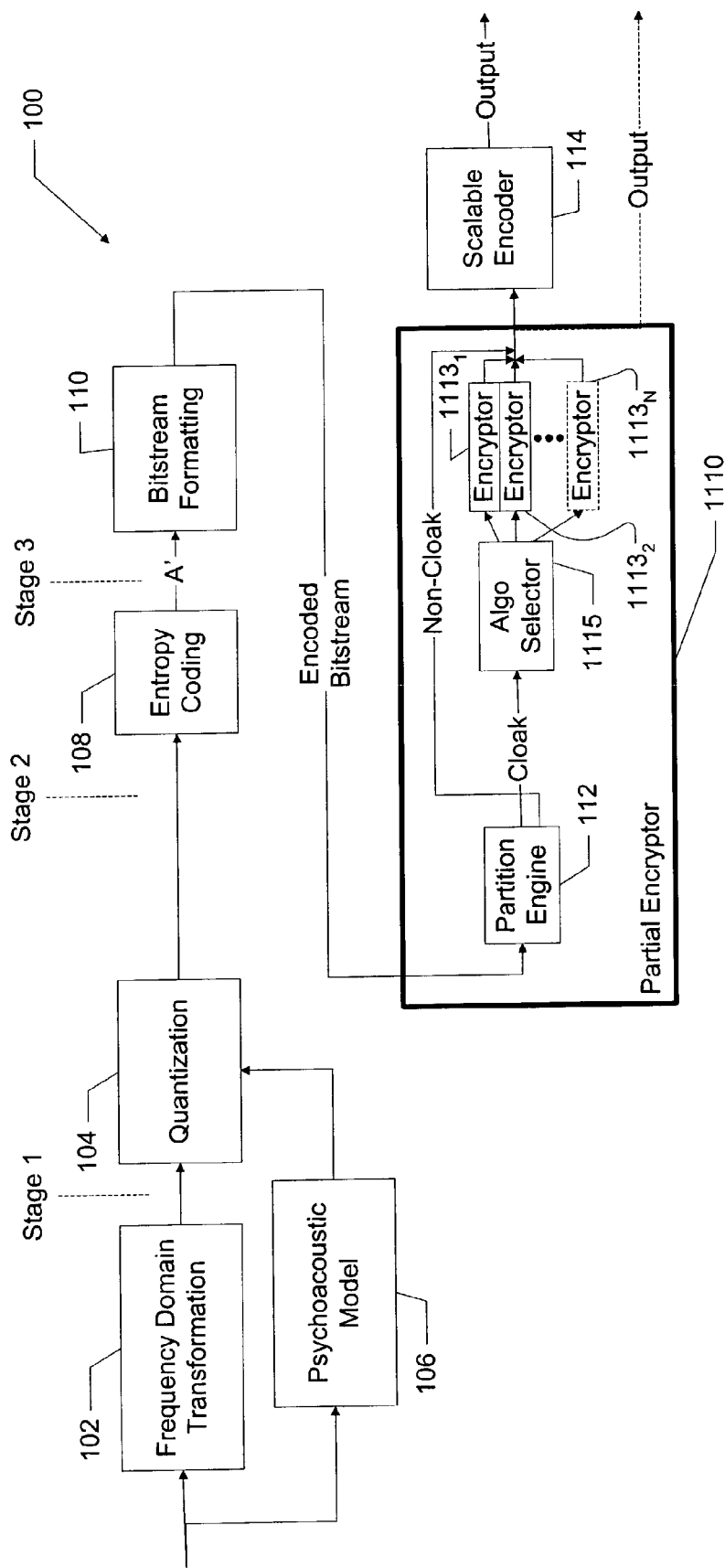
FIG. 11 is an alternative embodiment of the invention related to FIG. 1.

An alternative embodiment of the invention, related to FIG. 1, is depicted in FIG. 11. There the partial encryptor 1110, relative to encryptor 111, further includes an algorithm selector 1115 and a plurality of encryptors $1113_1 1113_2, \ldots 1113_N$ corresponding to a plurality of well known algorithms. The selector 1115 can be manual or automatic. For example, a key can be supplied having one or more bits that indicate which algorithm is to be used based upon the states of one or more bits in a packet's header.

The algorithm selector 1115 selects the algorithm to use on a particular segment and directs the corresponding data set to the respective encryptor 1113. Different segment of the same medium can be encrypted using different types or the same type of algorithm. For instance, in the case of fine granularity scalable encryption further described in detail below, the base layer, if encrypted, maybe encrypted using sign flipping or any fast encryption algorithms, while the enhancement layers (the bit planes) may use bit plane block-based scrambling to preserve the data structure for efficient coding.

Figure 12:
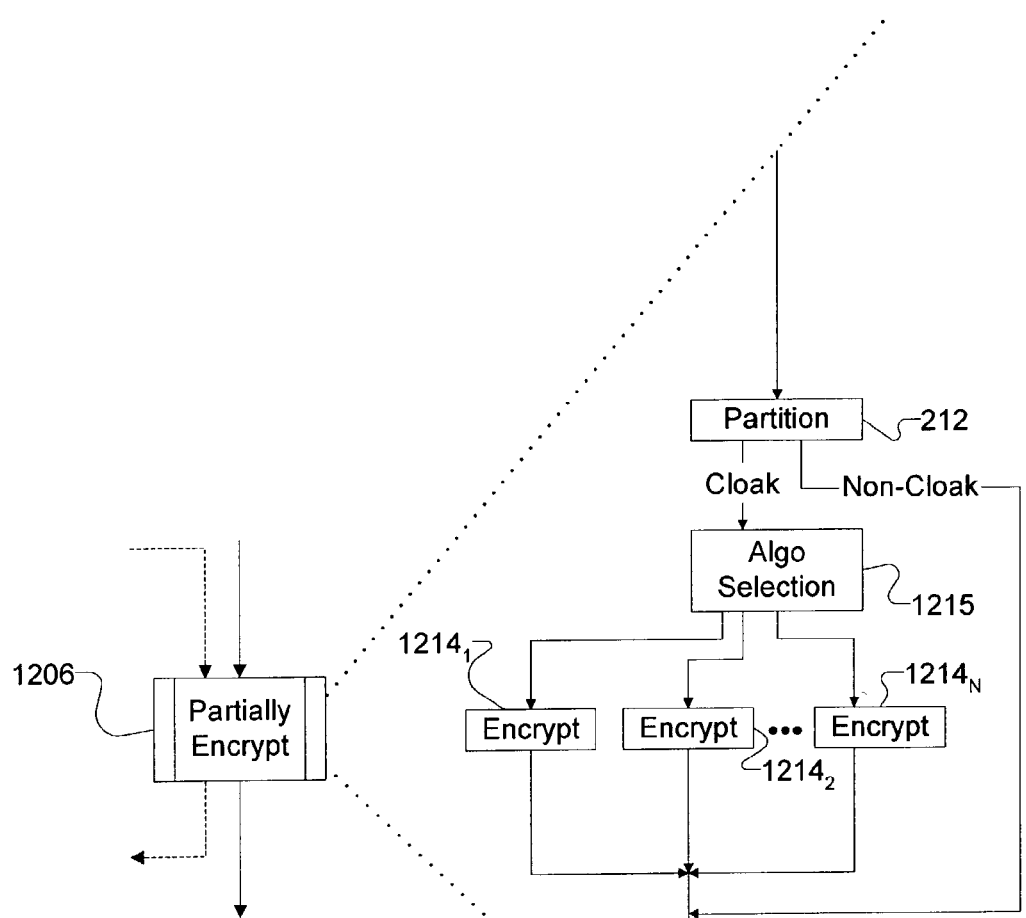
FIG. 12 is an alternative embodiment of the invention related to FIG. 2.

Another alternative embodiment of the invention, related to FIG. 2, is depicted in FIG. 12. In particular, a partial encryption block 1206 is shown as a replacement for the corresponding block 206 in FIG. 2. In FIG. 12, the cloak data flows to block 1215, where a selection from among a plurality of known algorithms is made. The corresponding sub-part of the cloak data flows to the respective encryption blocks $1214_1, 1214_2, \ldots 1214_N$. As in block 206, flow proceeds in block 1206 from the encryption blocks $1214_1, 1214_2, \ldots 1214_N$ to block 208 (not shown in FIG. 12).

It is also to be understood that, because the value of many commercial media degrades dramatically over time, the types of encryption algorithms to be chosen should be based on the content owner's requirement and the trade-off between computational time, network condition, cost, and quality.

Again, the invention may be embodied in other forms without departing from its spirit and essential characteristics. The described embodiments are to be considered only non-limiting examples of the invention. The scope of the invention is to be measured by the appended claims. All changes which come within the meaning and equivalency of the claims are to be embraced within their scope.

What is claimed is:

1. A method of partially encrypting streaming media received into a computer readable medium, the method comprising:
   receiving media in a streaming format;
   partitioning the stream-formatted media into cloak data and non-cloak data;
   encrypting the cloak data such that less than all of said stream-formatted media is encrypted; and
   using a key to indicate partition dimensions and domains.

2. The method of claim 1, further comprising:
   compressing said stream-formatted media, wherein the partial encryption operates upon the compressed media.

3. The method of claim 1, wherein the partition is of a one-dimensional partition.

4. The method of claim 3, wherein the dimension of partition is one of the time dimension, the spatial dimension and the bit plane dimension.

5. The method of claim 1, wherein the partition is a multidimensional partition such that there are at least two of a time dimension partition, a spatial dimension partition and a bit plane dimension partition.

6. The method of claim 5, wherein the partition is of a two dimensional partition such that a first one of the dimensions is the time dimension and a second one of the dimensions is a spatial dimension.

7. The method of claim 1, further comprising:
   scalably encoding the non-cloak data and the encrypted cloak data.

8. The method of claim 7, wherein the scalable encodation is either layer scalable or bit plane scalable, and wherein the layer scalable encodation includes a core layer and at least one enhancement layer.

9. The method of claim 8, wherein the layers of said layer scalable encodation represent a partition in one of the temporal dimension, the spatial dimension and the bit plane dimension.

10. A method of partially encrypting streaming media received into a computer readable medium, the method comprising:
    receiving media in a streaming format;
    partitioning the stream-formatted media into cloak data and non-cloak data;
    encrypting the cloak data such that less than all of said stream-formatted media is encrypted; and
    scalably encoding the non-cloak data and the encrypted cloak data, wherein the scalable encodation is either layer scalable or bit plane scalable, the layer scalable encodation includes a core layer and at least one enhancement layer, and the layers of said layer scalable encodation represent a partition in the bit plane dimension;
    wherein said core layer represents the more significant bit planes M−1, M−2, . . . M−K out of a total of M bit planes corresponding to an M-bit word architecture representing a pixel value; and
    wherein said enhancement layer represents the less significant bit planes M−K−1, M−K−2, . . . 1, 0; and
    wherein, where K<M, and both K and M are positive integers.

11. The method of claim 10, wherein said enhancement layer is encrypted.

12. The method of claim 1, wherein said step of partitioning selects a portion of said stream-formatted media irrespective of relative content importance.

13. The method of claim 12, wherein said stream-formatted media is divided into blocks, and
wherein the cloak data represents a predetermined subset of said blocks.

14. The method of claim 1, wherein said step of partitioning selects a portion of said stream-formatted media based upon relative content importance of different portions of the media.

15. The method of claim 14, wherein said step of partitioning selects for encryption said stream-formatted media whose content is of relatively greater importance.

16. The method of claim 14, wherein, for the circumstance in which stream-formatted media is formed based at least in part upon the Discrete Cosine Transformation ("DCT") or the modified DCT ("MDCT"), said cloak data corresponds to the lower frequency coefficients of said DCT or MDCT.

17. The method of claim 14, wherein, for the circumstance in which the partition is at least partly in the spatial dimension, said cloak data corresponds to a portion of the media representing an amount of motion that exceeds a predetermined level.

18. The method of claim 14, wherein
the partition is a bit plane partition; and
said cloak data corresponds to a subset of the bit planes.

19. A method of partially encrypting streaming media received into a computer readable medium, the method comprising:
receiving media in a streaming format;
partitioning the stream-formatted media into cloak data and non-cloak data; and
encrypting the cloak data such that less than all of said stream-formatted media is encrypted,
wherein said step of partitioning selects a portion of said stream-formatted media based upon relative content importance of different portions of the media, the partition is a bit plane partition, said cloak data corresponds to a subset of the bit planes, and said cloak data corresponds to the N most significant bit planes out of a total of M bit planes corresponding to an M-bit word architecture representing a pixel value, where N<M, and both N and M are positive integers.

20. An apparatus for partially encrypting streaming media received into a computer readable medium, the apparatus comprising:
means for receiving media to be streamed and for encoding said media into a streaming-media format;
partition means for partitioning the stream-formatted media into cloak data and non-cloak data;
encryption means for encrypting the cloak data such that less than all of said stream-formatted media is encrypted; and
key using means for using a key to indicate partition dimensions and domains.

21. The apparatus of claim 20, wherein said cloak data corresponds to a portion of the media whose content is of relatively greater importance.

22. The apparatus of claim 21, wherein, for the circumstance in which stream-formatted media is formed based at least in part upon the Discrete Cosine Transformation ("DCT") or the modified DCT ("MDCT"), said cloak data corresponds to the lower frequency coefficients of said DCT or MDCT.

23. The method of claim 21, wherein the partition is at least in part in the spatial dimension, and said cloak data corresponds to a portion of the media representing an amount of motion that exceeds a predetermined level.

24. The method of claim 21, wherein
the partition is a bit plane partition; and
said cloak data is a subset of the bit planes.

25. The computer-readable medium having code portions embodied thereon that, when read by a processor, cause said processor to perform the method of claim 1.

* * * * *

UNITED STATES PATENT AND TRADEMARK OFFICE
CERTIFICATE OF CORRECTION

| | |
|---|---|
| PATENT NO. | : 7,167,560 B2 |
| APPLICATION NO. | : 10/214101 |
| DATED | : January 23, 2007 |
| INVENTOR(S) | : Hong Heather Yu |

Page 1 of 1

It is certified that error appears in the above-identified patent and that said Letters Patent is hereby corrected as shown below:

Column 14, Line 35, Claim 25:
   "The" should be --A--

Signed and Sealed this

Twenty-second Day of May, 2007

JON W. DUDAS
*Director of the United States Patent and Trademark Office*